US008751630B2

(12) United States Patent
Shaffer et al.

(10) Patent No.: US 8,751,630 B2
(45) Date of Patent: Jun. 10, 2014

(54) COLLECTING STATUS FROM A PARTNER MANAGEMENT DOMAIN

(75) Inventors: Michael R. Shaffer, Longwood, FL (US); Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 169 days.

(21) Appl. No.: 12/580,404

(22) Filed: Oct. 16, 2009

(65) Prior Publication Data

US 2010/0104285 A1  Apr. 29, 2010

Related U.S. Application Data

(60) Provisional application No. 61/108,974, filed on Oct. 28, 2008.

(51) Int. Cl.
*G06F 15/173* (2006.01)

(52) U.S. Cl.
USPC ............ 709/224; 709/223; 709/225; 709/226

(58) Field of Classification Search
USPC ...................... 709/223–226; 398/166–172, 66
See application file for complete search history.

(56) References Cited

U.S. PATENT DOCUMENTS

| 2006/0228113 | A1* | 10/2006 | Cutillo et al. ................... 398/71 |
| 2007/0201487 | A1  | 8/2007  | Lin et al. |
| 2008/0138062 | A1* | 6/2008  | Tyrrell et al. ..................... 398/2 |
| 2008/0253771 | A1* | 10/2008 | Noel et al. ....................... 398/67 |
| 2009/0074423 | A1* | 3/2009  | Bernard et al. ................ 398/135 |
| 2009/0238561 | A1* | 9/2009  | Huang et al. .................... 398/25 |

FOREIGN PATENT DOCUMENTS

| CN | 1741490 A | 3/2006 |
| WO | 2005055580 A1 | 6/2005 |

OTHER PUBLICATIONS

"Extensible Markup Language (XML) 1.0 (Fourth Edition)," Tim Bray, Aug. 16, 2006, W3C, Edition 4, All.*
"Gigabit-capable Passive Optical Networks (G-PON): ONT management and control interface specification", Feb. 2008, Telecommunication Standardization Sector of ITU, 984.4, Series G: Transmission Systems and Media, Digital Systems and Networks Digital sections and digital line system—Optical line systems for local and access networks.*

(Continued)

*Primary Examiner* — Umar Cheema
(74) *Attorney, Agent, or Firm* — Conley Rose, P.C.; Grant Rodolph; Jonathan K. Polk (57) ABSTRACT

An apparatus comprising a Generic Status Portal (GSP) configured to grant access to a Managed Entity (ME) via an Optical Network Terminal (ONT) Management and Control Interface (OMCI), wherein the ME comprises status information about a non-OMCI management domain at the ONT. Also included is an apparatus comprising at least one processor configured to implement a method comprising initializing an ONT ME, adding status information associated with a managed function to the ONT ME, indicating a status information update of the ONT ME, and providing the status information via an OMCI. Included is a method comprising providing status and performance monitoring (PM) information from an ONT via an OMCI at the ONT, wherein the status and PM information is associated with at least one managed function instance of at least one non-OMCI domain.

21 Claims, 5 Drawing Sheets

(56) References Cited

OTHER PUBLICATIONS

"Series G: Transmission Systems and Media, Digital Systems and Networks—Digital Sections and Digital Line System—Optical Line Systems for Local and Access Networks—Gigabit-Capable Passive Optical Networks (G-PON): ONT Management and Control Interface Specification", ITU-T Recommendation G.984.4, (Feb. 2008).

"CPE WAN Management Protocol v1.1—TR-069", Broadband Technical Report, Issue 1, Amendment 2, Dec. 2007.

Foreign Communication From a Related Counterpart Application—International Search Report, PCT/CN2009/074648, Feb. 4, 2010, 4 pages.

Foreign Communication From a Related Counterpart Application—Written Opinion PCT/CN2009/074648, Feb. 4, 2010, 5 pages.

ITU-T, "Series G: Transmission Systems and Media, Digital Systems and Networks, Digital sections and digital line system—Optical line systems for local and access networks, ONT management and control interface specification for ATM PON" G.983.2, Apr. 2000, 143 pages.

Foreign Communication From a Related Counterpart Application, European Application No. 09823075.8, Extended European Search Report dated Sep. 15, 2011, 6 pages.

Foreign Communication From a Related Counterpart Application, Chinese Application No. 200980126202.8, Chinese Office Action dated Aug. 31, 2012, 6 pages.

Foreign Communication From a Related Counterpart Application, Chinese Application No. 200980126202.8, Partial English Translation of Chinese Office Action dated Aug. 31, 2012, 9 pages.

Foreign Communication From a Counterpart Application, Chinese Application No. 200980126202.8, Chinese Office Action dated May 22, 2013, 6 pages.

Foreign Communication From a Counterpart Application, Chinese Application No. 200980126202.8, Partial English Translation of Chinese Office Action dated May 22, 2013, 11 pages.

Foreign Communication From a Counterpart Application, European Application No. 09823075.8, European Office Action dated Sep. 9, 2013, 6 pages.

* cited by examiner

COLLECTING STATUS FROM A PARTNER MANAGEMENT DOMAIN

CROSS-REFERENCE TO RELATED APPLICATIONS

The present application claims priority to U.S. Provisional Patent Application 61/108,974, filed Oct. 28, 2008 by Michael R. Shaffer et al., and entitled "Method for Collecting Status from a Partner Management Domain," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multipoint (P2MP) network comprised of an optical line terminal (OLT) at the central office, an optical distribution network (ODN), and a plurality of Optical Network Terminals (ONTs) at the customer premises. The PON system may comprise a control and management (C/M) plane that controls and manages the data transmissions. The C/M plane may comprise an ONT Management and Control Interface (OMCI) that manages higher layers, such as one or more service defining layers. The OMCI may model data flow between the OLT and the ONTs using a protocol-independent management information base (MIB) that comprises a plurality of managed entities (MEs), for example as described in the OMCI for Gigabit PON (GPON), International Telecommunication Union Telecommunication Standardization Sector (ITU-T) publication G.984.4, which is incorporated by reference as if reproduced in its entirety.

Network Edge and Customer Premise Equipment (CPE) devices, such as ONTs, are typically used on the boundary of network management domains. The CPE devices may comprise different types of equipment such as ONTs, Residential Gateways, or Digital Subscriber Line (DSL) Access Multiplexers (DSLAMs). These CPE devices can vary from simple modem-like devices to complex devices that combine different networking functions. A complex device can have multiple management systems, where each management system may have a span of control referred to as a management domain.

Typically, different management domains in a Network Edge or CPE device use different interface technologies that are unique to the management domains. As such, from a management perspective, the device functionality may be divided into multiple domains, which are referred sometimes as "partner" domains. The partner domains coexist on such devices, where each domain has its own interface. To help effectively maintain such devices, network support personnel need to have the ability to collect status and performance monitoring (PM) information from one domain through its partner domain on the same device.

SUMMARY

In one embodiment, the disclosure includes an apparatus comprising a Generic Status Portal (GSP) configured to grant access to a ME via an OMCI, wherein the ME comprises status information about a non-OMCI management domain at the ONT.

In another embodiment, the disclosure includes an apparatus comprising at least one processor configured to implement a method comprising initializing an ONT ME, adding status information associated with a managed function to the ONT ME, indicating a status information update of the ONT ME, and providing the status information via an OMCI.

In yet another embodiment, the disclosure includes a method comprising providing status and PM information from an ONT via an OMCI at the ONT, wherein the status and PM information is associated with at least one managed function instance of at least one non-OMCI domain.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for accessing status information of a first management domain at an ONT via a second management domain interface at the ONT. The second management domain interface may be an OMCI domain and the status information may comprise status and PM information associated with the first management domain that is not an OMCI domain, also referred to herein as an OMCI partner domain. The ONT may comprise a GSP ME, which may be accessed by an OLT to obtain the status information of the OMCI partner domain using the OMCI. The GSP ME may provide the status information in a Status Document Table Attribute that may be configured in Extensible Markup Language (XML) document format. Additional status information may be provided by a plurality of PM MEs for a plurality of corresponding managed functions, a plurality of secondary GSP MEs for a plurality of corresponding OMCI partner domains, or both.

Figure 1:
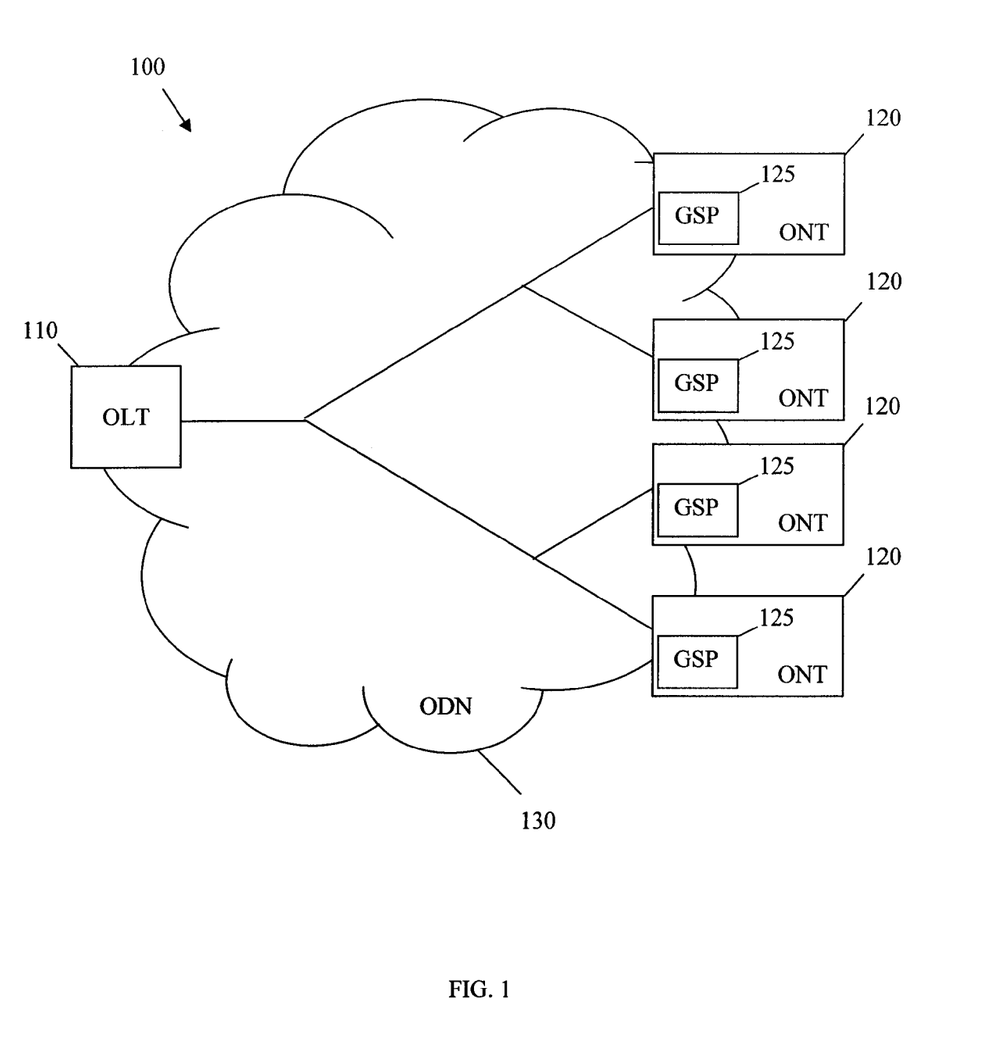
FIG. 1 is a schematic diagram of an embodiment of a PON.

FIG. 1 illustrates one embodiment of a PON 100. The PON 100 comprises an OLT 110, a plurality of ONTs 120, and an ODN 130, which may be coupled to the OLT 110 and the ONTs 120. The PON 100 may be a communications network that does not require any active components to distribute data between the OLT 110 and the ONTs 120. Instead, the PON 100 may use the passive optical components in the ODN 130 to distribute data between the OLT 110 and the ONTs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an Ethernet PON (EPON) defined by the IEEE 802.3ah standard, a 10 Gigabit EPON as defined by the IEEE 802.3av standard, an asynchronous transfer mode (ATM) PON (APON), a broadband PON (BPON) defined by the ITU-T G.983 standard, a GPON defined by the ITU-T G.984 standard, or a wavelength division multiplexed (WDM) PON (WPON), all of which are incorporated herein by reference as if reproduced in their entirety.

In an embodiment, the OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONTs 120 may be any devices that are configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment, the ONTs 120 may comprise an optical transmitter configured to send optical signals to the OLT 110 and an optical receiver configured to receive optical signals from the OLT 110. Additionally, the ONTs 120 may comprise a converter that converts the optical signal into electrical signals for the customer, such as signals in the Ethernet or ATM protocol, and a second transmitter and/or receiver that may send and/or receive the electrical signals to a customer device. In some embodiments, ONTs 120 and optical network units (ONUS) are similar, and thus the terms are used interchangeably herein. The ONTs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONTs 120. Alternatively, the ODN 130 may comprise one or a plurality of active components, such as optical amplifiers. The ODN 130 may typically extend from the OLT 110 to the ONTs 120 in a branching configuration as shown in FIG. 1, but may be alternatively configured in any other point-to-multi-point configuration.

In an embodiment, the ONT 120 may be configured using a plurality of different management domains, which may each have a different network interface at the ONT 120. The management domains may comprise an OMCI domain and other partner domains, such as a Simple Network Management Protocol (SNMP) domain and/or a DSL Forum TR-69 domain. Typically, the network interface associated with each domain may be used to access only the status information associated with that domain. As such, the OLT 110 may need to access the network interface associated with each domain to obtain different status and PM information for different management domain. This may complicate overall network maintenance and monitoring, where the OLT 110 may not be able to use the OMCI to access or use status information from OMCI partner domains (non-OMCI domains), such as the SNMP domain.

To improve maintenance and monitoring of the ONT 120, the ONT 120 may be configured to support access of information across multiple domains using one of the network interfaces at the ONT 120. Specifically, the ONT 120 may comprise a GSP 125, which may be accessed via the OMCI at the ONT 120. For example, the OLT 120 or any Element Management System (EMS) in the network may use OMCI MIB MEs to obtain the status information from the ONT 120. The GSP 125 may provide access to the status information, such as to a database that comprises different status and PM information associated with a plurality of different management domains at the ONT 120. The GSP 125 may be accessed via the OMCI to obtain at least some status and PM information, which may be associated with OMCI partner domains in the ONT 120 that are non-OMCI domains. In an embodiment, the GSP 125 may provide access to a plurality of MEs for each non-OMCI managed function instance on the ONT 120 that corresponds to a non-OMCI domain. The GSP 125 may also provide access to a plurality of MEs for a plurality of OMCI partner domains (e.g. non-OMCI domains). In an alternative embodiment, the ONT 120 may comprise a different GSP 125 for each OMCI partner domain that provides the associated status information.

Figure 2:
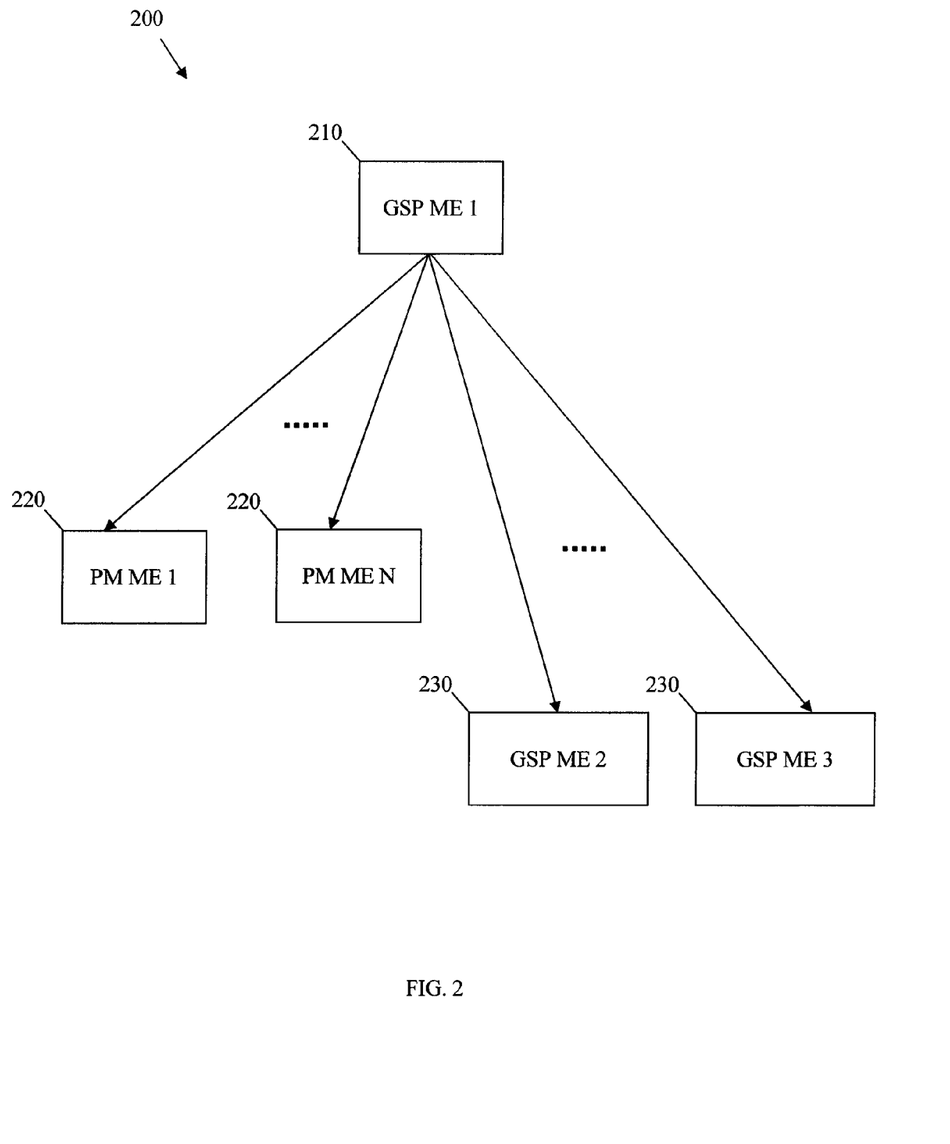
FIG. 2 is a schematic diagram of an embodiment of a GSP ME architecture.

FIG. 2 illustrates an embodiment of a GSP ME architecture 200, which may be used for accessing the status information for a plurality of managed function instances for at least one management domain at an ONT, such as the ONT 120. The status information may be accessed via at least one GSP at the ONT, such as the GSP 125, using the OMCI at the ONT. The GSP ME architecture 200 may be associated with at least one OMCI partner domain and may comprise at least one corresponding GSP ME. For instance, the GSP ME architecture 200 may comprise a GSP ME 210 and a plurality of PM MEs 220, which may be linked to the GSP ME 210. For example, the GSP ME 210 may point to N PM MEs 220 (e.g. PM ME 1 to PM ME N), where N is an integer. Each PM ME 220 may provide status information that corresponds to a managed function instance associated with the OMCI partner domain. Additionally or alternatively, the GSP ME 210 may point to a plurality of additional GSP MEs 230 (e.g. GSP ME 2 and GSP ME 2), where each additional GSP ME 230 may provide status information that corresponds to an additional OMCI partner domain. In an embodiment, the GSP ME 210, the PM MEs 220, and/or the additional GSP MEs 230 may be stored and maintained in a database in the ONT. In some embodiments, a copy of the ONT MEs may also be stored and updated by the OLT or EMS. In FIG. 2, the links between the GSP ME 210, the PM MEs 220, and the additional GSP MEs 230 are represented by arrows.

Similar to the GSP ME 210, any PM ME 220 or additional GSP ME 230 may point to a plurality of subsidiary PM MEs (not shown), which may provide status information about a plurality of managed function instances associated with one OMCI partner domain. Additionally or alternatively, the PM ME 220 or the additional GSP ME 230 may point to a plurality of subsidiary GSP MEs (not shown), which may provide status information about a plurality of managed functions associated with a plurality of OMCI partner domains. In an embodiment, the GSP ME 210, the GSP MEs 230, and/or PM MEs may point to less than or about seven different subsidiary PM MEs and/or GSP MEs. However, the subsidiary PM MEs or GSP MEs may also be further linked to less than or about seven additional MEs (PM MEs and/or GSP MEs). Such a recursive relationship between the different MEs in the GSP ME architecture 200 may allow access to status information for a substantially large quantity of managed function instances and for a plurality of OMCI partner domains. As such, the limitation imposed by the maximum number of links allowed per ME may be circumvented.

Figure 3:
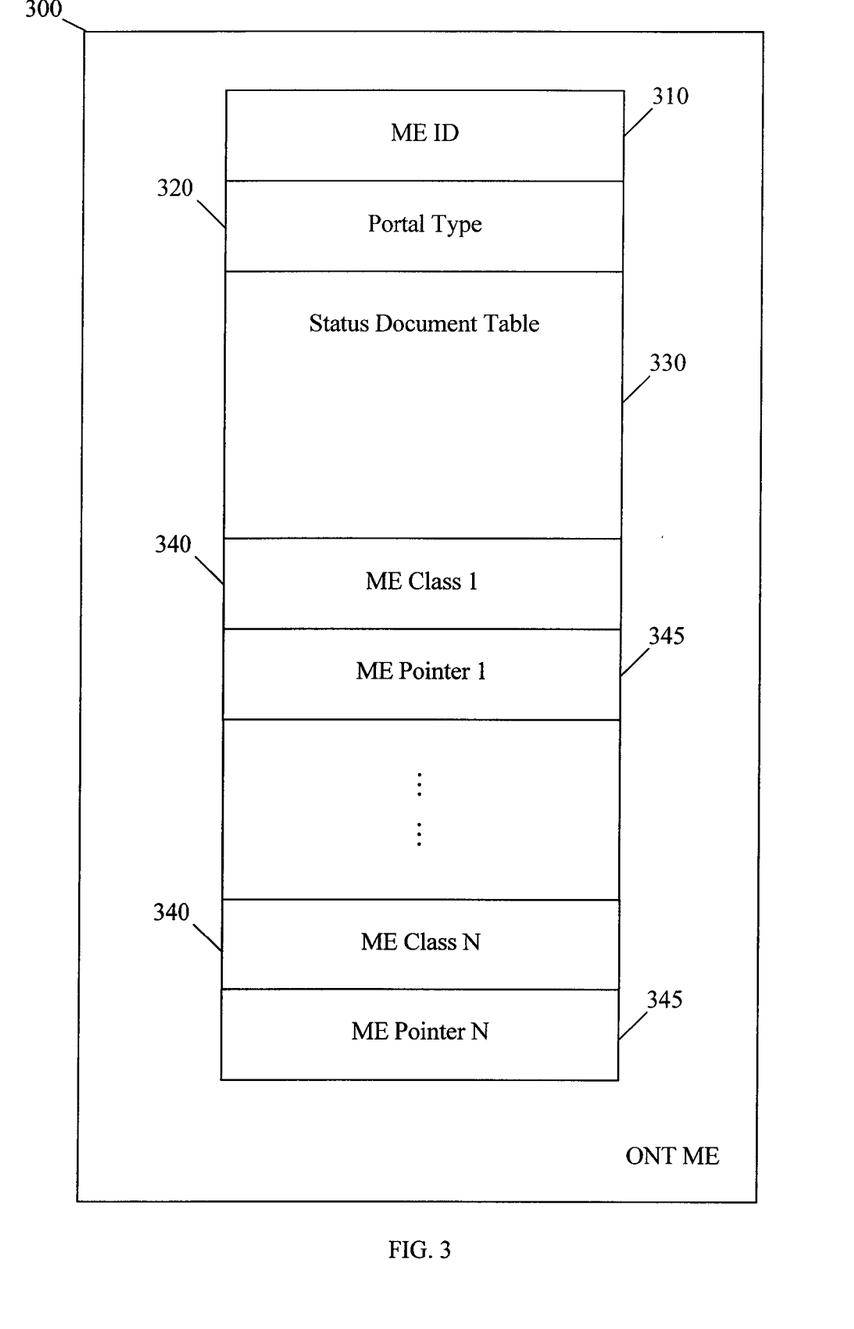
FIG. 3 is a schematic diagram of an embodiment of an ONT ME.

FIG. 3 illustrates an embodiment of an ONT ME 300, such as a GSP ME or PM ME, which may be accessed by the GSP to provide status information about the ONT. The ONT ME 300 may comprise a plurality of ME attributes, including a ME Identity (ID) 310, a Portal Type 320, a Status Document Table 330, at least one ME Class 340, and at least one corresponding ME Pointer 345. The Status Document attribute 330 may comprise the status information and the other attributes may comprise information about the ONT ME 300 and any other associated MEs that may be linked to the ONT ME 300.

In an embodiment, the ME ID 310 may identify a managed entity instance, such for a non-OMCI managed function. The ME ID 310 may associate the ONT ME 300 with a managed entity instance of an OMCI partner domain. In an embodiment, the ME ID 310 may have a size equal to about two bytes. As such, different ONT MEs may be associated with different management function instances for the same or different OMCI partner domain using different ME IDs.

In an embodiment, the Portal Type 320 may identify the type of the non-OMCI managed function associated with the management domain. In an embodiment, the Port Type ID 320 may have a size equal to about one byte. For instance, the Portal Type 320 may be set to a value equal to about one for a Residential Gateway managed function, about two for a Circuit Emulation Service (CES) managed function, about three for a 802.11 station managed function, about four for an Internet Protocol (IP) router managed function, or about five for a DSL (or xDSL) service managed function. The Portal Type 320 may also be set to any reserved value, for instance from about six to about 255 to indicate other types of managed functions.

In an embodiment, the Status Document Table 330 may be established for the first ME in a group of associated or linked MEs, such as the GSP ME 210 in the GSP ME architecture 200. Initially, when the ONT ME 300 is established for the ONT, the Status Document Table 330 may also be set to about zero. Subsequently, the status information associated with the GSP ME may be added to the Status Document Table attribute 330. The Status Document Table 330 may be formatted in an XML document format, which may be available to the OLT or EMS upon request. For example, the Status Document Table 330 may be saved as an XML schema file (".xsd") in the database in the ONT. Formatting the Status Document Table 330 in XML document format may simplify the creation and configuration of tools, which may be used to parse and interpret the content of the document. The Status Document Table 330 may have a variable size depending on the amount of status information. As such, the content of the document may be parsed or obtained using a "get" and "get next" sequence of commands, which may be suitable for unspecified content size.

The Status Document Table 330 may comprise textual representation of some status and PM information about a managed function instance for a management domain. The content of the Status Document Table 330 may be specified by the vendor of the ONT. In an embodiment, a first element of the document may comprise an XML declaration that indicates the version of the XML and encoding used in the remainder of the document. Additionally, a second element of the document may comprise a schema reference to the vendor's schema used in the remainder of the document.

In an embodiment, the ME Class 340 may identify an OMCI class of the ME specified by the corresponding ME Pointer 345. For example, the ME Class 340 may indicate if the ME specified by the corresponding ME Pointer 345 is a PM ME or a GSP ME. Accordingly, the corresponding ME Pointer 345 may point to a PM ME or GSP ME linked to the ONT ME 300. In an embodiment, each of the ME Class 340 and the ME Pointer 345 may have a size equal to about two bytes. Initially, when the ONT ME 300 is established for the ONT, each of the ME Class 340 and the ME Pointer 345 may be set to about zero.

Figure 4:
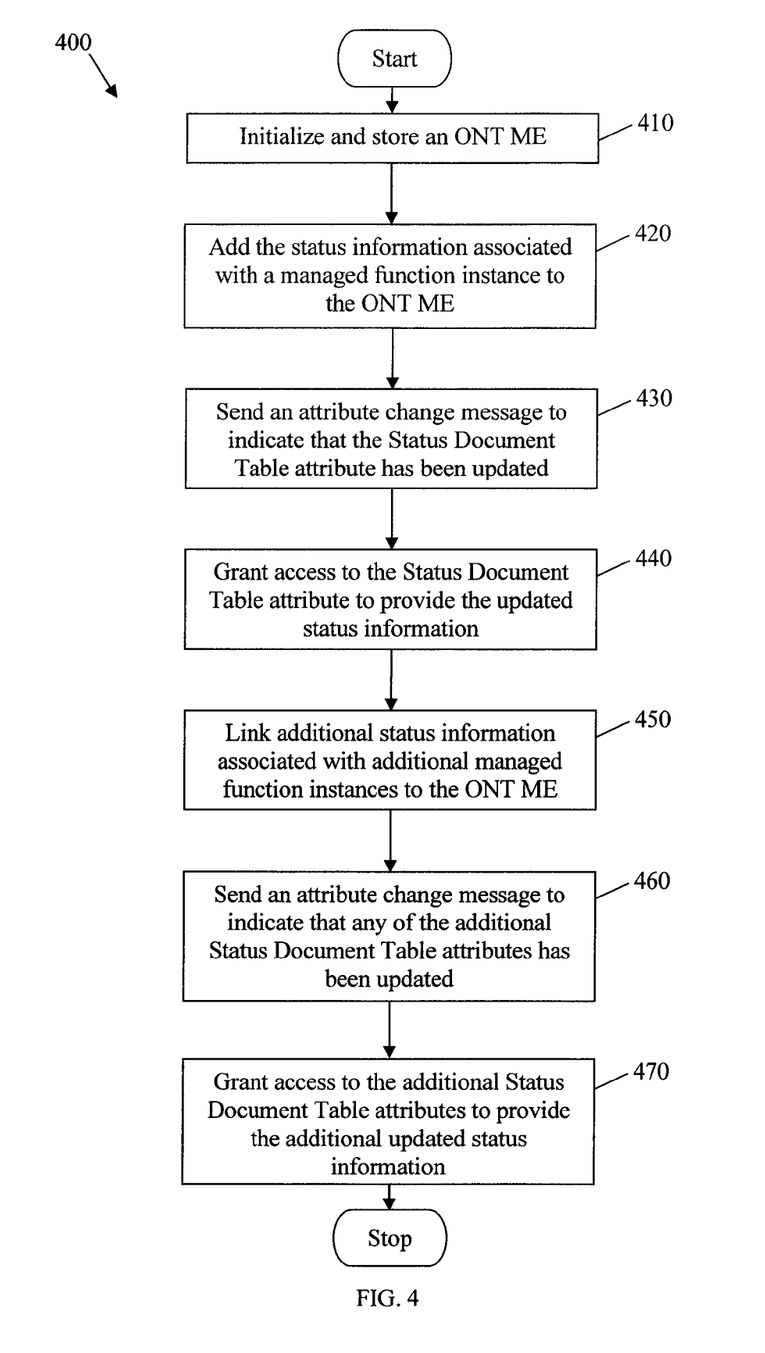
FIG. 4 is a flowchart of an embodiment of an ONT ME handling method.

FIG. 4 illustrates one embodiment of an ONT ME handling method 400, which may be used to establish and maintain an ONT ME, such as the ONT ME 300, at the ONT. The ONT ME handling method 400 may begin at block 410, where the ONT ME may be initialized and stored, e.g. at a database in the OLT. For instance, a plurality of attributes for a GSP ME associated with a managed function instance for an OMCI partner domain may be set and stored at the ONT. The attributes, such as the attributes of the ONT ME 300, may be initialized by the OMCI partner domain of the ONT and stored at a database in the ONT. During the ONT ME initialization, the ME ID attribute may be assigned a value that identifies the associated managed function instance and the Portal Type attribute 320 may be assigned a value that identifies the type of the managed function associated with the OMCI partner domain. Additionally, the Status Document Table attribute 330 may be empty, e.g. set to about zero, and no subsidiary MEs may be specified, e.g. the ME class and ME pointer attributes may also be set to about zero.

Next at block 420, the status information associated with the managed function instance may be added to the ONT ME. For instance, status and PM information of the managed function may be added in XML document format to the Status Document Table attribute 330. The status information may be added by the OMCI partner domain of the managed function. At block 430, an attribute change message may be sent to indicate that the Status Document Table attribute 330 has been updated. The ONT may send the attribute change message to the OLT to inform the OLT that the status information in the Status Document Table attribute is updated. The status change message may comprise a value change attribute, which may be set to about one to indicate an update to the Status Document Table attribute 330 from a non-OMCI domain. At block 440, access to the Status Document Table attribute 330 may be granted to provide the updated status information. For instance, the OLT may access the GSP at the ONT via the OMCI to obtain the status information, such as in the form of a XML schema file (".xsd").

In some embodiments, the ONT ME handling method 400 may comprise additional steps, such as when additional status information is linked to the ONT ME. For instance, at the next block 450, additional status information associated with additional managed function instances may be linked to the ONT ME. The additional status information may be added to additional PM MEs for additional managed function instances by the same OMCI partner domain. The ONT ME, which may be a GSP ME, may thus be linked to the additional PM MEs by updating the values of the ME class and corresponding ME pointer attributes of the ONT ME. Additionally or alternatively, additional status information associated with additional OMCI partner domains may be linked to the ONT ME. The additional status information may be added to additional GSP MEs, which may also be linked to the ONT ME by updating the values of the ME class and corresponding pointer attributes. The additional status information may be added by the additional OMCI partner domains. The additional status information may be added to additional Status Document Table attributes 330 in the PM MEs and/or GSP MEs.

Next, at block 460, an attribute change message may be sent to indicate that any of the additional Status Document Table attributes 330 has been updated. The ONT may send the attribute change message to the OLT to inform the OLT that the status information in one of the additional Status Document Table attributes 330 is updated, e.g. from a non-OMCI domain. At block 470, access to any of the Status Document Table attributes 330 may be granted to provide the additional updated status information. For instance, the OLT may access the same GSP at the ONT via the OMCI to obtain different status information for different managed functions that may correspond to the same OMCI partner domain (e.g. in a PM ME) or a different OMCI partner domain (e.g. in a GSP ME). Alternatively, the OLT may access different GSPs at the ONT to obtain different status information that correspond to different OMCI partner domains (e.g. in different GSP MEs). The additional status information may be obtained by first accessing the ME class and corresponding ME pointer attributes in the ONT ME, which may redirect the OLT to the additional Status Document Tables in the ONT. The additional status information in the additional Status Document Tables may be exchanged in the form of XML schema files (".xsd").

Figure 5:
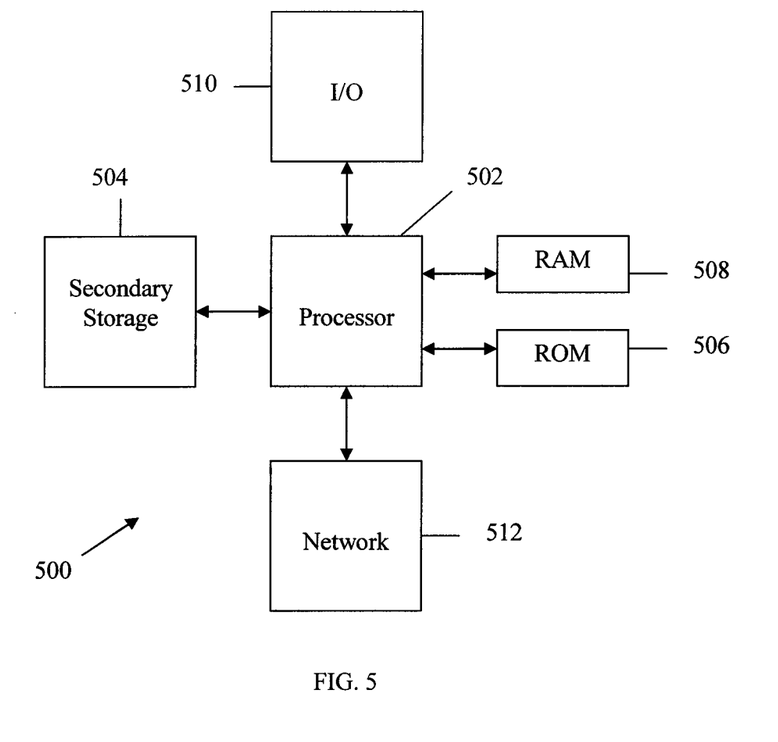
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical network terminal (ONT) comprising:
a processor configured to use a Generic Status Portal (GSP) to grant access to a Managed Entity (ME) via an ONT Management and Control Interface (OMCI),
wherein the ME comprises status information about a non-OMCI management domain in the ONT,
wherein the ME provides the status information about the non-OMCI management domain via the OMCI,
wherein at least a portion of the non-OMCI management domain communicates via a non-OMCI at the ONT,
wherein the ME uses a Status Document Table attribute to pass a textual representation of a non-OMCI management domain status to an Optical Line Terminal (OLT), wherein the contents of the Status Document Table are vendor specific and formatted as an Extensible Markup Language (XML) document, wherein a first element of the XML document contains an XML declaration indicating a version of XML and encoding used in a remainder of the XML document, and wherein a second element of the XML document contains a schema reference to a vendor supplied schema used by the remainder of the XML document.

2. The ONT of claim 1, wherein the status information comprises status and performance monitoring information associated with a managed function instance of the non-OMCI management domain, wherein the managed function instance communicates via the non-OMCI at the ONT, and wherein the managed function instance comprises a processor.

3. The ONT of claim 2, wherein the managed function instance is a Residential Gateway managed function, a Circuit Emulation Service (CES) managed function, an Institute of Electrical and Electronics Engineers (IEEE) 802.11 station managed function, an Internet Protocol (IP) router managed function, or a Digital Subscriber Line (DSL or xDSL) service managed function.

4. The ONT of claim 1, wherein the ME is a GSP ME that is linked to at least one secondary ME.

5. The ONT of claim 4, wherein the secondary ME is a Performance Monitoring (PM) ME that comprises secondary status information about the non-OMCI management domain, and wherein the secondary status information comprises status and PM information associated with a second managed function instance of the non-OMCI management domain.

6. The ONT of claim 4, wherein the secondary ME is a second GSP ME that comprises secondary status information about a second non-OMCI management domain, and wherein the secondary status information comprises status and performance monitoring information associated with a second managed function instance of the second non-OMCI management domain.

7. The ONT of claim 1, wherein the status information about the non-OMCI management domain is accessible by an Optical Line Terminal (OLT) or an Element Management System (EMS) via the GSP using the OMCI.

8. The ONT of claim 1, wherein the status information is stored in a Status Document Table attribute in an Extensible Markup Language (XML) document format.

9. The ONT of claim 8, wherein the Status Document Table attribute comprises an XML declaration that indicates the version of the XML and the encoding used in the XML document, and wherein the Status Document Table attribute comprises a schema reference to a vendor's schema used in the XML document.

10. An optical network terminal (ONT) comprising:
at least one processor configured to:
initialize an ONT Managed Entity (ME);
add status information associated with a managed function to the ONT ME;
indicate a status information update of the ONT ME;
provide the status information about a non-ONT Management and Control Interface (non-OMCI) management domain via an OMCI; and
communicate information about the non-OMCI management domain via a non-OMCI,
wherein the managed function corresponds to the non-OMCI management domain,
wherein the ONT ME uses a Status Document Table attribute to pass a textual representation of a non-OMCI management domain status to an Optical Line Terminal (OLT), wherein the contents of the Status Document Table are vendor specific and formatted as an Extensible Markup Language (XML) document, wherein a first element of the XML document contains an XML declaration indicating a version of XML and encoding used in a remainder of the XML document, and wherein a second element of the XML document contains a schema reference to a vendor supplied schema used by the remainder of the XML document.

11. The ONT of claim 10, wherein the ONT ME comprises a plurality of attributes, including an ME Identity (ID), a Portal Type, at least one ME class, and at least one corresponding ME pointer.

12. The ONT of claim 11, wherein the ONT ME is initialized by setting a value of the ME ID to indicate the associated managed function, setting a Portal Type value to indicate a type of the managed function, setting a Status Document Value to zero, and setting ME class and corresponding ME pointer values to zero.

13. The ONT of claim 10, wherein the status information update is indicated by sending an attribute change message, and wherein the attribute change message comprises a value change attribute that is equal to one.

14. The ONT of claim 10, wherein the processor is further configured to:
link secondary status information associated with a second managed function to the ONT ME;
indicate a second status information update of the ONT ME; and
provide the secondary status information via the OMCI,
wherein the second managed function corresponds to the non-OMCI management domain.

15. A method comprising:
providing status and performance monitoring (PM) information from an Optical Network Terminal (ONT) via an ONT Management and Control Interface (OMCI) at the ONT, wherein the status and PM information comprises information about at least one non-OMCI management domain and is associated with at least one managed function instance of the at least one non-OMCI management domain in the ONT; and
communicating by the at least one managed function instance of the at least one non-OMCI management domain via a non-OMCI at the ONT,
wherein an ONT Managed Entity (ME) uses a Status Document Table attribute to pass a textual representation of a non-OMCI management domain status to the OLT, wherein the contents of the Status Document Table are vendor specific and formatted as an Extensible Markup Language (XML) document, wherein a first element of the XML document contains an XML declaration indicating a version of XML and encoding used in a remainder of the XML document, and wherein a second element of the XML document contains a schema reference to a vendor supplied schema used by the remainder of the XML document.

16. The method of claim 15, wherein the status and PM information is provided for a plurality of managed function instances using a plurality of PM Management Entities (MEs), for a plurality of non-OMCI domains using a plurality of Generic Status Portal (GSP) MEs, or both.

17. The method of claim 16, wherein the PM MEs, the GSP MEs, or both have a maximum number of links allowed per ME that is equal to seven links.

18. The method of claim 17, wherein the PM MEs, the GSP MEs, or both are linked to each other using pointers in a recursive relationship to provide a quantity of MEs that exceeds the maximum number of links allowed per ME.

19. The ONT of claim 1, further comprising a non-OMCI ME, wherein the non-OMCI ME is configured to be controlled via the non-OMCI at the ONT, and wherein the non-OMCI ME comprises a processor.

20. An optical network unit (ONU) comprising:
a processor configured to:
use a non-Optical Network Terminal Management and Control Interface (non-OMCI) management domain to communicate information via an OMCI and a non-OMCI; and
use a generic status portal (GSP) managed entity (ME) to provide a way for an Optical Line Terminal (OLT) to discover status and configuration information of the non-OMCI management domain within the ONU,
wherein one instance of a GSP ME is created by the OLT for each separate non-OMCI management domain whose information is desired to be visible,
wherein the GSP ME uses a Managed Entity Identity attribute that uniquely identifies each instance of a GSP ME,
wherein the GSP ME uses a Status Document Table attribute to pass a textual representation of a non-OMCI management domain status to the OLT, wherein the contents of the Status Document Table are vendor specific and formatted as an Extensible Markup Language (XML) document, wherein a first element of the XML document contains an XML declaration indicating a version of XML and encoding used in a remainder of the XML document, and wherein a second element of the XML document contains a schema reference to a vendor supplied schema used by the remainder of the XML document.

21. The ONT of claim 1, wherein the GSP is a network interface at the ONT, and wherein the GSP is accessible via the OMCI at the ONT.

* * * * *